(12) United States Patent
Bennemann et al.

(10) Patent No.: US 11,254,261 B2
(45) Date of Patent: Feb. 22, 2022

(54) METHOD FOR FORMING AN EMERGENCY LANE ON A MULTI-LANE ROAD AND TRANSPORTATION VEHICLE HAVING AN APPARATUS FOR CARRYING OUT THE METHOD

(71) Applicant: VOLKSWAGEN AKTIENGESELLSCHAFT, Wolfsburg (DE)

(72) Inventors: Mark Bennemann, Falkensee (DE); Robert Jan Wyszka, Hannover (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/744,870

(22) Filed: Jan. 16, 2020

(65) Prior Publication Data
US 2020/0231088 A1    Jul. 23, 2020

(30) Foreign Application Priority Data

Jan. 23, 2019   (DE) .................... 10 2019 200 822.4

(51) Int. Cl.
| | |
|---|---|
| *G05D 1/02* | (2020.01) |
| *B60Q 1/52* | (2006.01) |
| *H04W 4/90* | (2018.01) |
| *H04W 4/40* | (2018.01) |
| *B60W 50/14* | (2020.01) |
| *G09F 21/04* | (2006.01) |

(52) U.S. Cl.
CPC .............. *B60Q 1/52* (2013.01); *B60W 50/14* (2013.01); *G09F 21/048* (2013.01); *H04W 4/40* (2018.02); *H04W 4/90* (2018.02); *B60Q 2400/50* (2013.01); *B60W 2050/146* (2013.01)

(58) Field of Classification Search
CPC ....... B60Q 1/52; B60Q 2400/50; H04W 4/90; H04W 4/40; B60W 50/14; B60W 2050/146; G09F 21/048
See application file for complete search history.

(56) References Cited

U.S. PATENT DOCUMENTS

| | | | | |
|---|---|---|---|---|
| 9,896,107 | B1* | 2/2018 | Huang | B60W 50/14 |
| 10,134,280 | B1* | 11/2018 | You | B60Q 1/34 |
| 2003/0098801 | A1* | 5/2003 | Martin | G08G 1/0965 340/902 |
| 2005/0117364 | A1* | 6/2005 | Rennick | B60Q 1/2665 362/540 |
| 2006/0026162 | A1 | 2/2006 | Salmonsen et al. | |

(Continued)

FOREIGN PATENT DOCUMENTS

| | | |
|---|---|---|
| DE | 9315134 U1 | 12/1993 |
| DE | 202005020199 U1 | 3/2006 |

(Continued)

*Primary Examiner* — Munear T Akki
(74) *Attorney, Agent, or Firm* — Barnes & Thornburg LLP

(57) ABSTRACT

A method for forming an emergency lane on a multi-lane road on which multiple transportation vehicles are located on at least two parallel driving lanes and on which at least one emergency vehicle is located, wherein the emergency vehicle is connected to more than one of the transportation vehicles via a wireless communications connection to exchange data and the transportation vehicles are prompted to form an emergency lane via the wireless communications connection. A transportation vehicle having an apparatus for implementing the method.

9 Claims, 4 Drawing Sheets

(56) References Cited

U.S. PATENT DOCUMENTS

| | | | |
|---|---|---|---|
| 2006/0213100 A1 | 9/2006 | McCann | |
| 2006/0260162 A1 | 11/2006 | Ballinger | |
| 2013/0335212 A1* | 12/2013 | Purks | B60Q 1/38 340/435 |
| 2015/0321698 A1* | 11/2015 | Fuehrer | G08G 1/162 701/41 |
| 2017/0232908 A1 | 8/2017 | Jung | |
| 2017/0371337 A1* | 12/2017 | Ramasamy | G06K 9/00798 |
| 2019/0049994 A1* | 2/2019 | Pohl | G05D 1/0278 |
| 2019/0206260 A1* | 7/2019 | Pilkington | B60Q 1/44 |
| 2019/0392715 A1* | 12/2019 | Strau | B60W 30/165 |

FOREIGN PATENT DOCUMENTS

| | | |
|---|---|---|
| DE | 102012002563 A1 | 9/2012 |
| DE | 102014200700 A1 | 7/2015 |
| DE | 102014219317 A1 | 3/2016 |
| DE | 102015014789 A1 | 5/2016 |
| DE | 102018004287 A1 | 10/2018 |
| WO | 2010037766 A1 | 4/2010 |

\* cited by examiner

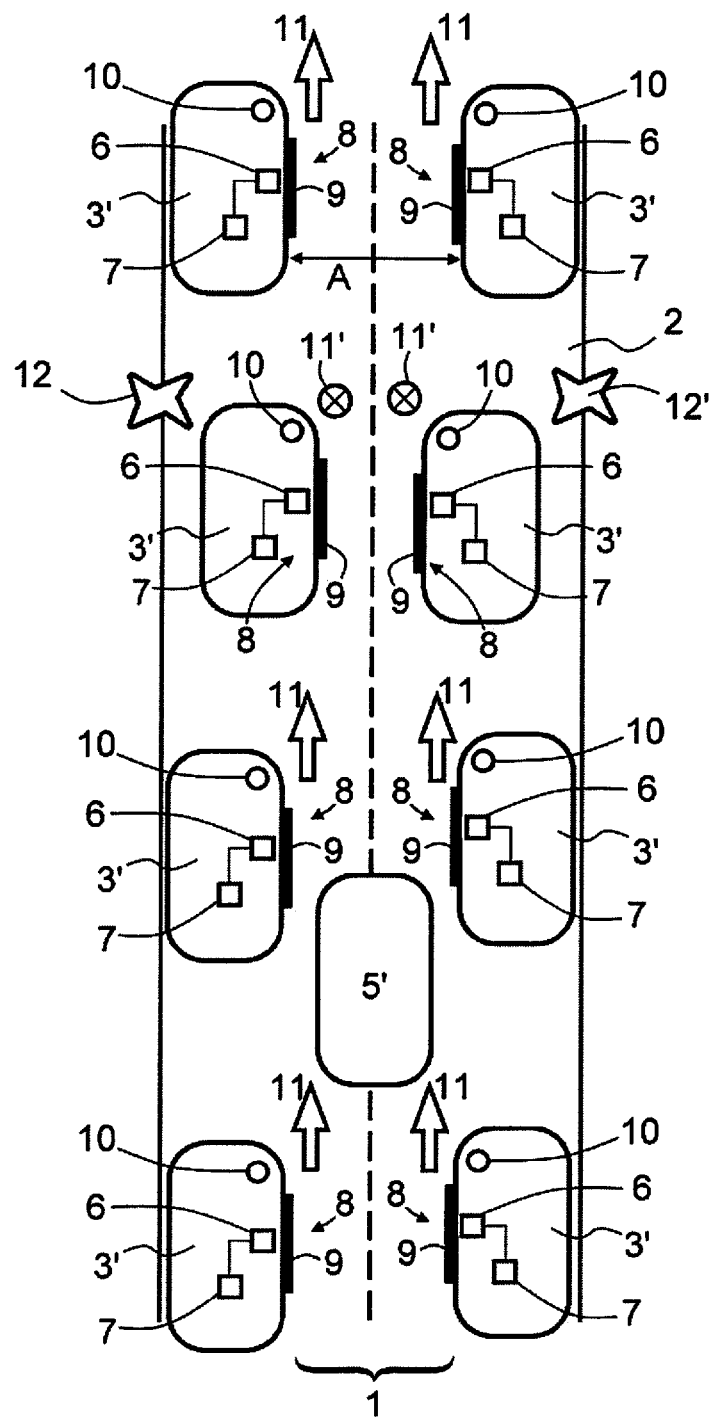

METHOD FOR FORMING AN EMERGENCY LANE ON A MULTI-LANE ROAD AND TRANSPORTATION VEHICLE HAVING AN APPARATUS FOR CARRYING OUT THE METHOD

PRIORITY CLAIM

This patent application claims priority to German Patent Application No. 10 2019 200 822.4, filed 23 Jan. 2019, the disclosure of which is incorporated herein by reference in its entirety.

SUMMARY

Illustrative embodiments relate to a method for forming an emergency lane on a multi-lane road on which multiple transportation vehicles are located on at least two parallel driving lanes and on which at least one emergency vehicle is located, wherein the emergency vehicle may be connected to more than one of the transportation vehicles via a wireless communications connection so as to exchange data and the emergency vehicle and transportation vehicle are prompted to form an emergency lane via the wireless communications connection.

Moreover, illustrative embodiments relate to a transportation vehicle having an apparatus for implementing the method.

BRIEF DESCRIPTION OF THE DRAWINGS

Disclosed embodiments are explained below with the aid of the figures. In the drawings:

FIGS. 2a-2b illustrate the formation of an emergency lane; and

DETAILED DESCRIPTION

Figure 1:
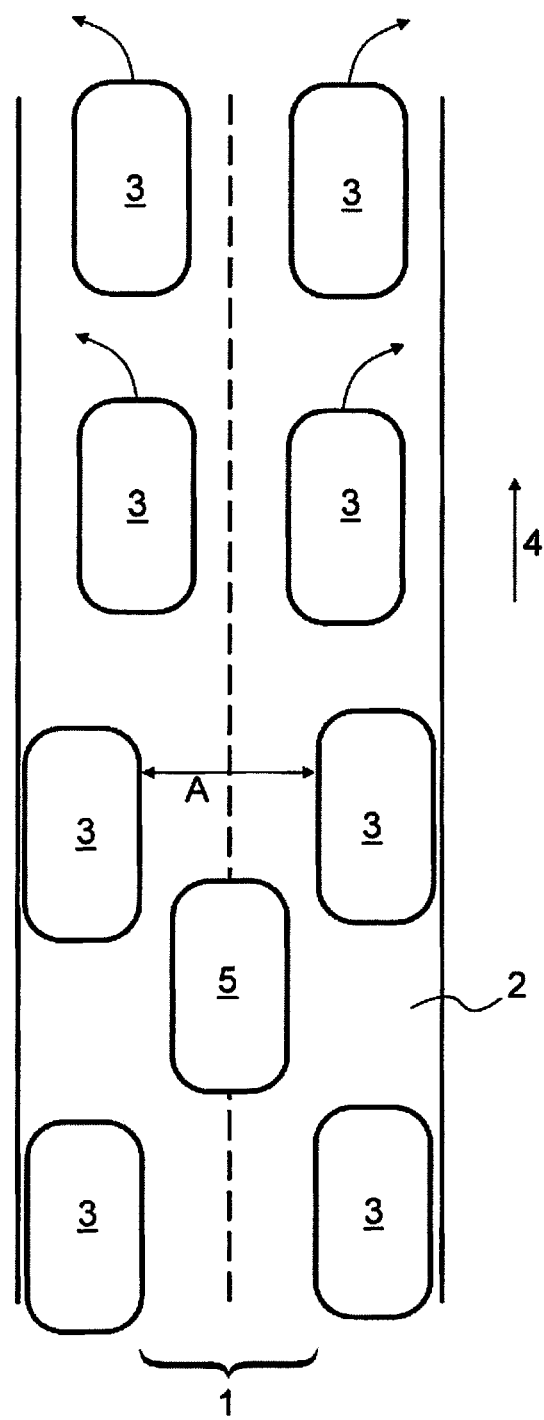
FIG. 1 illustrates the formation of an emergency lane according to the prior art.

Methods and apparatuses of the above-mentioned type are disclosed in current research and development projects for modern traffic systems in which the transportation vehicles and/or traffic-guiding infrastructure elements, such as by way of example traffic signs or traffic lights, are linked to one another via wireless communications connections. By way of example, DE 10 2012 002 563 A1 discloses a transportation vehicle apparatus having a warning data information system that comprises a display element with which it is possible by way of example when a traffic jam lies ahead to warn the following traffic by a warning signal.

Comparable display apparatuses that may also be used and may be realized outside of a vehicle for the purpose of advertising to road users are disclosed in US 2006/026162 A1, US 2017/0232908 A1 and WO 2010/037766 A1.

In traffic jams that are caused by accidents, it has been shown that existing methods and apparatuses are not yet sufficient to reliably form emergency lanes and to ensure an emergency vehicle drives along the emergency lane quickly because the instructions to the transportation vehicles of a traffic jam that lies ahead are generally not yet sufficient for the drivers of the transportation vehicles to form an emergency lane. Moreover, during an already hectic emergency journey with blue light and siren the driver of an emergency vehicle may not always estimate exactly whether the emergency lane that is formed is sufficient for driving along the emergency lane without collision.

Disclosed embodiments propose a method and a transportation vehicle having an apparatus for implementing the method, the method and transportation vehicle rendering it possible to reliably form an emergency lane and rendering it possible for an emergency vehicle to drive along the emergency lane quickly.

This is achieved by the disclosed method and the disclosed transportation vehicle. In accordance with the disclosed embodiments it is provided that:

a) the transportation vehicles comprise distance sensors that determine the distance of a transportation vehicle with respect to transportation vehicles on the parallel driving lane; and b) an evaluating unit determines whether an emergency lane has been created with sufficient lane width; and c) the transportation vehicles respectively comprise a display apparatus for identifying the emergency lane, the display apparatus outputting a first signal when an existing emergency lane has a sufficient lane width and outputting a second signal when an emergency lane is blocked.

As a consequence, it is directly displayed to the driver of the emergency vehicle whether the emergency lane that lies ahead has been formed with a sufficient lane width and whether it is possible to drive along the emergency lane comparatively quickly to the location of the emergency.

According to at least one disclosed embodiment, it is provided that the display apparatus of the transportation vehicles comprises a display and/or a lighting strip and the display apparatus may be arranged on the side of the body of the transportation vehicle. It is possible via a display of this type or a lighting strip for the first signal for identifying and representing an emergency lane and the second signal for displaying a blocked emergency lane to be presented in such a way that the driver of the emergency vehicle may receive the presented information immediately while driving without it being necessary in this case to avert the gaze from the road. In this case, the first signal differs from the second signal by way of example in the color with which the display and/or lighting strip illuminates. By way of example, a blue first signal and a red second signal is conceivable. In a disclosed embodiment, the display apparatus may also comprise a loudspeaker for outputting acoustic signals.

Alternatively and/or in addition, according to a disclosed embodiment it is provided that the display apparatus of the transportation vehicles comprises a projecting device that:

a) projects the lateral delimitation of a created emergency lane onto the surface of the multi-lane road; and/or b) displays a blocked emergency lane by projecting a symbol onto the surface of the multi-lane road.

The projection of the lateral delimitation of an emergency lane is beneficial when an emergency vehicle drives along the emergency lane quickly and/or when visibility conditions are poor since it is immediately displayed to the driver of the emergency vehicle in which region it is possible to drive along the emergency lane safely and without collision. A possible blockage of the emergency lane may be more identifiable as a projection onto the road surface than the singular display on a transportation vehicle body.

According to at least one disclosed embodiment, it is provided that the display apparatus of a transportation vehicle comprises a display element that is arranged within the transportation vehicle and that signals to the driver of the transportation vehicle that an emergency lane is created or blocked so that not only the driver of the emergency vehicle is informed regarding the emergency lane that is sufficiently created. For the case that the transportation vehicle itself is causing the blockage of the emergency lane, the driver of the transportation vehicle may immediately check whether there is space to get out of the way to the left-hand side and/or to the right-hand side of the transportation vehicle with the result that the emergency lane may be quickly unblocked.

The specific embodiment of the wireless communications connection between the transportation vehicles and also between the transportation vehicles and the emergency vehicle is principally not specified, the wireless communications connection may be embodied as a Car2x communication, in particular, a Car2Car communication, and the wireless communications connection comprises all wireless communication methods, in particular, WiFi, internet and the like.

The display apparatus that is described above is not only configured so as to form and identify an emergency lane but rather also provides other law enforcement agencies the option of indicating possible instructions externally in response to behavior that is contrary to road traffic regulations or the like. By way of example, the transportation vehicle may be marked by the police in the event of possible infringements, which may be immediately visible for other road users by suitable symbols. By way of example, the impermissible journey through an environmental zone or exceeding a permissible parking duration may be automatically reproduced on the display apparatus.

FIG. 1 illustrates the typical sequence for forming an emergency lane 1 on a multi-lane road 2 on which multiple transportation vehicles 3 are at a standstill or are only progressing at a low speed in the direction of travel 4 and on which an emergency vehicle 5 must travel along the emergency lane 1. The emergency vehicle 5 typically comprises signaling devices, such as by way of example blue light and siren (not illustrated in detail), with the result that the transportation vehicles 3 ahead are prompted to form the emergency lane 1 and to get out of the way toward the left-hand side or right-hand side, as a result of which the emergency lane 1 is provided with sufficient lane width A. The reaction time of drivers of the transportation vehicles 3 ahead is in many cases comparatively slow with the result that the emergency vehicle 5 may only move forward at a comparatively slow speed within the emergency lane 1, which delays the arrival at the location of the emergency.

Figure 2A:
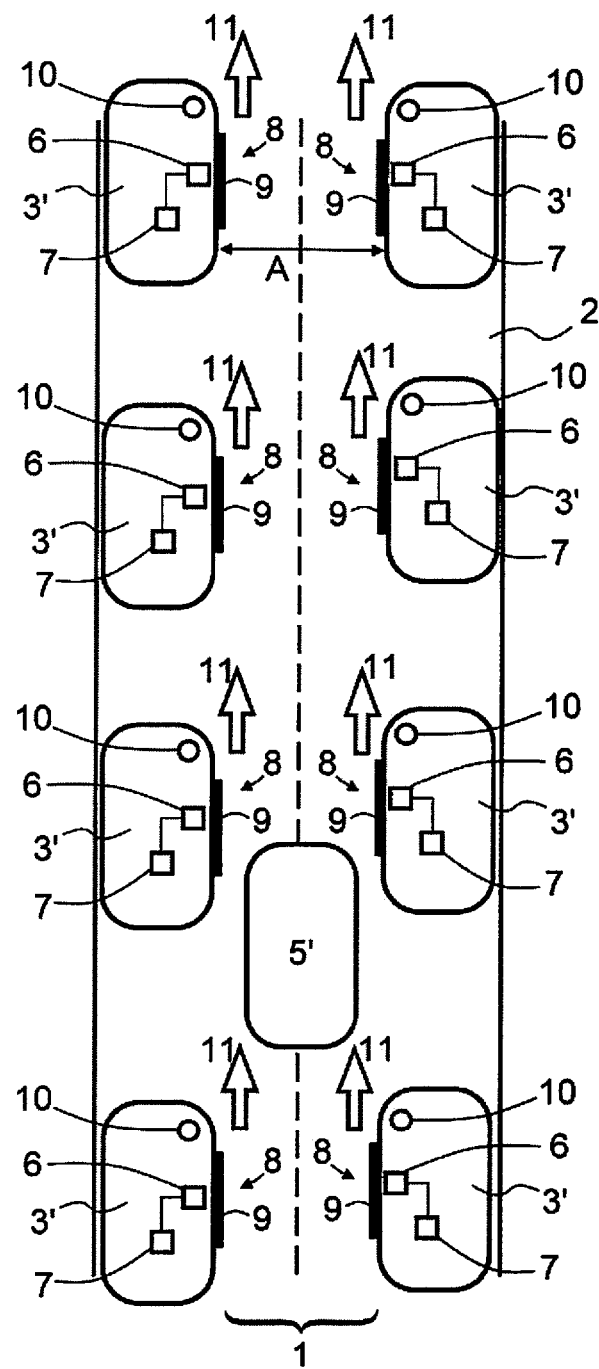

The FIGS. 2a-b illustrate the formation of an emergency lane 1 with transportation vehicles 3' and an emergency vehicle 5' that are configured so as to implement the method in accordance with the disclosure and are linked to one another by a wireless communications connection so as to exchange data. The transportation vehicles 3' ahead are prompted at an early stage by the wireless link to form an emergency lane 1. In this case, distance sensors 6 and respectively an evaluating unit 7 are provided within the transportation vehicles 3', the distance sensors and evaluating unit checking the lane width A of the emergency lane 1 that is formed. If the check discovers a sufficient lane width A, this is accordingly signaled by way of a first signal by a display apparatus 8. Otherwise, the display apparatus 8 displays a second signal that represents or signals a blocked emergency lane 1. The two signals confirm to the driver of the emergency vehicle 5' in this case that the request to form an emergency lane 1 has been received.

In the illustrated exemplary embodiment, the display apparatus 8 initially comprises a display 9 that is arranged on the outer side of the transportation vehicle body and that is configured at least so as to reproduce the first and the second signal. Furthermore, a projecting device 10 is respectively arranged that signals a free and/or blocked emergency lane 1 by projecting different symbols 11, 11' onto the surface of the road. FIG. 2a illustrates respectively arrows as the first symbol 11, the arrows corresponding to the outer delimitation of the emergency lane 1 that is formed within which the emergency vehicle 5' may move forward without collision. FIG. 2b illustrates second symbols 11' at a bottleneck at which by way of example debris 12, 12' that is caused by an accident prevents the formation of a sufficiently wide emergency lane 1, the second symbols representing or displaying a blocked emergency lane.

Figure 3:
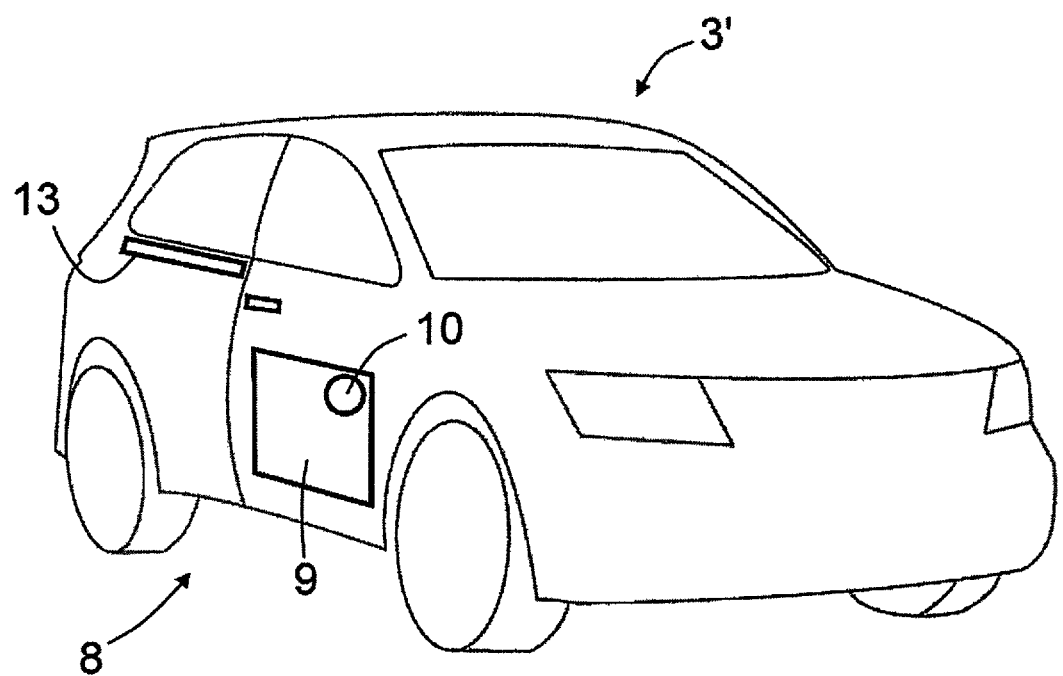
FIG. 3 illustrates a transportation vehicle having an apparatus for forming an emergency lane.

FIG. 3 illustrates a transportation vehicle 3' that is configured so as to implement the method described above and a display apparatus 8 having a display 9, a lighting strip 13 and a projecting device 10.

LIST OF REFERENCE NUMERALS

1 Emergency lane
2 Multi-lane road
3, 3' Transportation vehicles
4 Direction of travel
5, 5' Emergency vehicle
6 Distance sensor
7 Evaluating unit
8 Display apparatus
9 Display
10 Projecting device
11, 11' Symbols
12, 12' Debris
13 Lighting strip
A Lane width of the emergency lane

The invention claimed is:

1. A transportation vehicle that is configured to form an emergency lane on a multi-lane road on which multiple transportation vehicles are located on at least two parallel driving lanes and on which at least one emergency vehicle is located, wherein the at least one emergency vehicle is in communication with more than one of the transportation vehicles via a wireless communications connection to exchange data and the multiple transportation vehicles are prompted to form the emergency lane via the wireless communications connection, the transportation vehicle comprising:
  one or more distance sensors configured to determine a distance of a transportation vehicle with respect to transportation vehicles on the parallel driving lane;
  an evaluating unit to determine whether the emergency lane has been created with sufficient lane width; and
  a display apparatus for identifying the emergency lane, wherein the display apparatus is configured to output a first signal responsive to determination by the evaluating unit that the emergency lane is defined with sufficient lane width and to output a second signal responsive to determination by the evaluating unit that the emergency lane is blocked due to insufficient lane width,
  wherein the display apparatus comprises at least one of: (i) a display element arranged within the transportation vehicle that signals the driver of the transportation vehicle that the emergency lane is created and/or blocked, and (ii) a projecting device configured to project lateral delimitations of the defined emergency lane onto a surface of the multi-lane road and/or to display a blocked emergency lane by projecting a symbol onto the surface of the multi-lane road.

2. The transportation vehicle of claim 1, wherein the display apparatus comprises a display and/or a lighting strip and the display apparatus is arranged on the side of a body of the transportation vehicle.

3. The transportation vehicle of claim 1, wherein the wireless communications connection is a Car2X communication.

4. A method for forming an emergency lane on a multi-lane road on which multiple transportation vehicles are located on at least two parallel driving lanes and on which at least one emergency vehicle is located, wherein the at least one emergency vehicle is connected to more than one of the multiple transportation vehicles via a wireless communications connection to exchange data and the multiple transportation vehicles are prompted to form the emergency lane via the wireless communications connection,
  wherein one or more of the multiple transportation vehicles comprise distance sensors that determine the distance of a transportation vehicle with respect to transportation vehicles on the parallel driving lane, and
  wherein an evaluating unit determines whether the emergency lane has been created with sufficient lane width, and
  wherein one or more of the multiple transportation vehicles respectively comprise a display apparatus for identifying the emergency lane, the display apparatus configured for outputting a first signal responsive to determination by the evaluating unit that the emergency lane is defined with sufficient lane width and for outputting a second signal responsive to determination by the evaluating unit that the emergency lane is blocked due to insufficient lane width,
  wherein the display apparatus comprises at least one of: (i) a display element arranged within the transportation vehicle that signals the driver of the transportation vehicle that the emergency lane is created and/or blocked, and (ii) a projecting device configured to project lateral delimitations of the defined emergency lane onto a surface of the multi-lane road and/or to display a blocked emergency lane by projecting a symbol onto the surface of the multi-lane road.

5. The method of claim 4, wherein the display apparatus of the transportation vehicles comprises a display and/or a lighting strip and the display apparatus is arranged on the side of the body of the transportation vehicle.

6. The method of claim 4, wherein the wireless communications connection is embodied as Car2X communication.

7. An emergency lane formation system provided in a transportation vehicle and configured to form an emergency lane on a multi-lane road on which multiple transportation vehicles are located on at least two parallel driving lanes and on which at least one emergency vehicle is located, wherein the at least one emergency vehicle is in communication with more than one of the multiple transportation vehicles via a wireless communications connection to exchange data and the multiple transportation vehicles are prompted to form the emergency lane via the wireless communications connection, the emergency lane formation system comprising:
  one or more distance sensors configured to determine a distance of the transportation vehicle with respect to transportation vehicles on the parallel driving lane;
  an evaluating unit to determine whether the emergency lane has been created with sufficient lane width; and
  a display apparatus for identifying the emergency lane, wherein the display apparatus is configured to output a first signal responsive to determination by the evaluation unit that the emergency lane is defined with sufficient lane width and to output a second signal responsive to determination by the evaluation unit that the emergency lane is blocked due to insufficient lane width,
  wherein the display apparatus comprises at least one of: (i) a display element arranged within the transportation vehicle that signals the driver of the transportation vehicle that the emergency lane is created and/or blocked, and (ii) a projecting device configured to project lateral delimitations of the defined emergency lane onto a surface of the multi-lane road and/or to display a blocked emergency lane by projecting a symbol onto the surface of the multi-lane road.

8. The emergency lane formation system of claim 7, wherein the display apparatus comprises a display and/or a lighting strip and the display apparatus is arranged on the side of a body of the transportation vehicle.

9. The emergency lane formation system of claim 7, wherein the wireless communications connection is a Car2X communication.

* * * * *